United States Patent
Selvaraj et al.

(10) Patent No.: US 11,919,404 B2
(45) Date of Patent: Mar. 5, 2024

(54) VEHICLE HIGH VOLTAGE BATTERY CASE ATTACHMENT SYSTEM

(71) Applicants: Prabhu Selvaraj, Farmington Hills, MI (US); Tim Coffin, Clarkston, MI (US); Christopher M Smith, Rochester Hills, MI (US)

(72) Inventors: Prabhu Selvaraj, Farmington Hills, MI (US); Tim Coffin, Clarkston, MI (US); Christopher M Smith, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 151 days.

(21) Appl. No.: 17/379,574

(22) Filed: Jul. 19, 2021

(65) Prior Publication Data
US 2023/0016145 A1    Jan. 19, 2023

(51) Int. Cl.
*B60L 50/64* (2019.01)
*B60K 1/04* (2019.01)

(52) U.S. Cl.
CPC .............. *B60L 50/64* (2019.02); *B60K 1/04* (2013.01)

(58) Field of Classification Search
CPC .................................. B60L 50/64; B60K 1/04
See application file for complete search history.

(56) References Cited

U.S. PATENT DOCUMENTS

| | | | |
|---|---|---|---|
| 8,833,839 B2 * | 9/2014 | Young | B62D 25/025 296/187.08 |
| 9,517,686 B1 | 12/2016 | Paramasivam et al. | |
| 9,937,781 B1 | 4/2018 | Bryer et al. | |
| 10,720,620 B1 * | 7/2020 | Grace | H01M 50/244 |
| 10,780,767 B2 | 9/2020 | Rawlinson et al. | |
| 2009/0226806 A1 | 9/2009 | Kiya | |
| 2013/0020139 A1 | 1/2013 | Kim et al. | |
| 2016/0114667 A1 | 4/2016 | Ikeda et al. | |
| 2023/0163390 A1 * | 5/2023 | Wassmur | |

* cited by examiner

*Primary Examiner* — James A Shriver, II
*Assistant Examiner* — Nicholas R. Kandas
(74) *Attorney, Agent, or Firm* — Jeremy J. Klobucar

(57) ABSTRACT

A high voltage battery case assembly for a vehicle includes a battery case having a plurality of walls at least partially defining a cavity configured to receive one or more high voltage battery modules, a sacrificial pocket formed on an exterior of the battery case and including a thin-walled section, and an attachment bracket configured to couple between the sacrificial pocket and a body of the vehicle. The thin-walled section is configured to intentionally break away from the sacrificial pocket when the attachment bracket receives an impact load of a predetermined energy level to thereby facilitate protecting the high voltage battery case assembly from the impact load.

19 Claims, 3 Drawing Sheets

VEHICLE HIGH VOLTAGE BATTERY CASE ATTACHMENT SYSTEM

FIELD

The present application relates generally to high voltage battery systems for vehicles and, more particularly, to a high voltage battery case assembly with a sacrificial attachment system.

BACKGROUND

Some vehicles, such as plug-in electric hybrid vehicles (PHEV), include a high voltage (HV) battery case tightly packaged inside the vehicle. However, due to the tight packaging, the HV battery case may be subject to loading from surrounding components during impact events, which can potentially affect battery case integrity. Moreover, some conventional battery cases are fabricated from aluminum using a high pressure die cast process that, while cost and weight effective, may result in brittle cases that can potentially fracture if subjected to impact loads. Therefore, while such systems do work well for their intended purpose, it is desirable to provide continuous improvement in the relevant art.

SUMMARY

In accordance with one example aspect of the invention, a high voltage battery case assembly for a vehicle is provided. In one example implementation, the assembly includes a battery case having a plurality of walls at least partially defining a cavity configured to receive one or more high voltage battery modules, a sacrificial pocket formed on an exterior of the battery case and including a thin-walled section, and an attachment bracket configured to couple between the sacrificial pocket and a body of the vehicle. The thin-walled section is configured to intentionally break away from the sacrificial pocket when the attachment bracket receives an impact load of a predetermined energy level to thereby facilitate protecting the high voltage battery case assembly from the impact load.

In addition to the foregoing, the assembly may include one or more of the following features: wherein the attachment bracket is coupled to the thin-walled section; wherein the sacrificial pocket includes an outer wall, an upper wall, and a pair of opposed reinforcing side walls; wherein the sacrificial pocket defines an opening and an interior pocket cavity; wherein at least a portion of the attachment bracket is received within the interior pocket cavity; wherein the outer wall is the thin-walled section and includes an inner surface facing the interior pocket cavity; and wherein the attachment bracket is coupled to the inner surface of the outer wall.

In addition to the foregoing, the assembly may include one or more of the following features: wherein the outer wall defines a first set of fastener apertures and the attachment bracket defines a second set of fastener apertures, wherein the first and second set of fastener apertures are aligned and receive one or more fasteners therethrough to thereby couple the attachment bracket to the sacrificial pocket; wherein the battery case includes a perimeter flange, and wherein each of the reinforcing side walls is coupled to the perimeter flange and one wall of the plurality of walls; wherein the sacrificial pocket and thin-walled section are integrally cast with the battery case; and a non-sacrificial attachment integrally formed with the battery case, wherein the non-sacrificial attachment is configured to be coupled to the vehicle body and is designed to withstand the impact load to facilitate preventing dislodging of the high voltage battery case assembly from the vehicle body.

In addition to the foregoing, the assembly may include one or more of the following features: wherein the plurality of walls includes a front wall, a rear wall, opposed first and second side walls, and a bottom wall; wherein the sacrificial pocket includes a first sacrificial pocket integrally formed with the first side wall, a second sacrificial pocket integrally formed with the second side wall, a third sacrificial pocket integrally formed with the front wall, and a fourth sacrificial pocket integrally formed with the front wall; a first non-sacrificial attachment integrally formed with the battery case, and a second non-sacrificial attachment integrally formed with the battery case, wherein the first and second non-sacrificial attachments are configured to be coupled to the vehicle body and are designed to withstand the impact load to facilitate preventing dislodging of the high voltage battery case assembly from the vehicle body; and wherein the attachment bracket is an L-shaped stamped metal bracket configured to absorb at least a portion of the impact load.

In accordance with another example aspect of the invention, a vehicle is provided. In one example implementation, the vehicle includes a body and a high voltage battery case assembly. The case assembly includes a battery case having a plurality of walls at least partially defining a cavity configured to receive one or more high voltage battery modules, a sacrificial pocket formed on an exterior of the battery case and including a thin-walled section, and an attachment bracket configured to couple between the sacrificial pocket and the body. The thin-walled section is configured to intentionally break away from the sacrificial pocket when the attachment bracket receives an impact load of a predetermined energy level to thereby facilitate protecting the high voltage battery case assembly from the impact load.

In addition to the foregoing, the described vehicle may include one or more of the following features: wherein the plurality of walls includes a front wall, a rear wall, opposed first and second side walls, and a bottom wall; wherein the sacrificial pocket includes a first sacrificial pocket integrally formed with the first side wall, a second sacrificial pocket integrally formed with the second side wall, a third sacrificial pocket integrally formed with the front wall, and a fourth sacrificial pocket integrally formed with the front wall; and a first non-sacrificial attachment integrally formed with the battery case rear wall, and a second non-sacrificial attachment integrally formed with the battery case rear wall, wherein the first and second non-sacrificial attachments are configured to be coupled to the vehicle body and are designed to withstand the impact load to facilitate preventing dislodging of the high voltage battery case assembly from the vehicle body.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

According to the principles of the present application, systems and methods are described for a high voltage (HV) battery case assembly for a vehicle. The HV battery case assembly is attached to the vehicle underbody by a plurality of sacrificial and non-sacrificial attachments. The non-sacrificial attachments are bolted directly to the underbody and configured as no-fail attachments designed to withstand impact loads. The sacrificial attachments are designed to break at impact loads and are created as pockets in the battery case with thinner sections (sacrificial pockets) attached to the underbody using stamped steel brackets.

Figure 1:
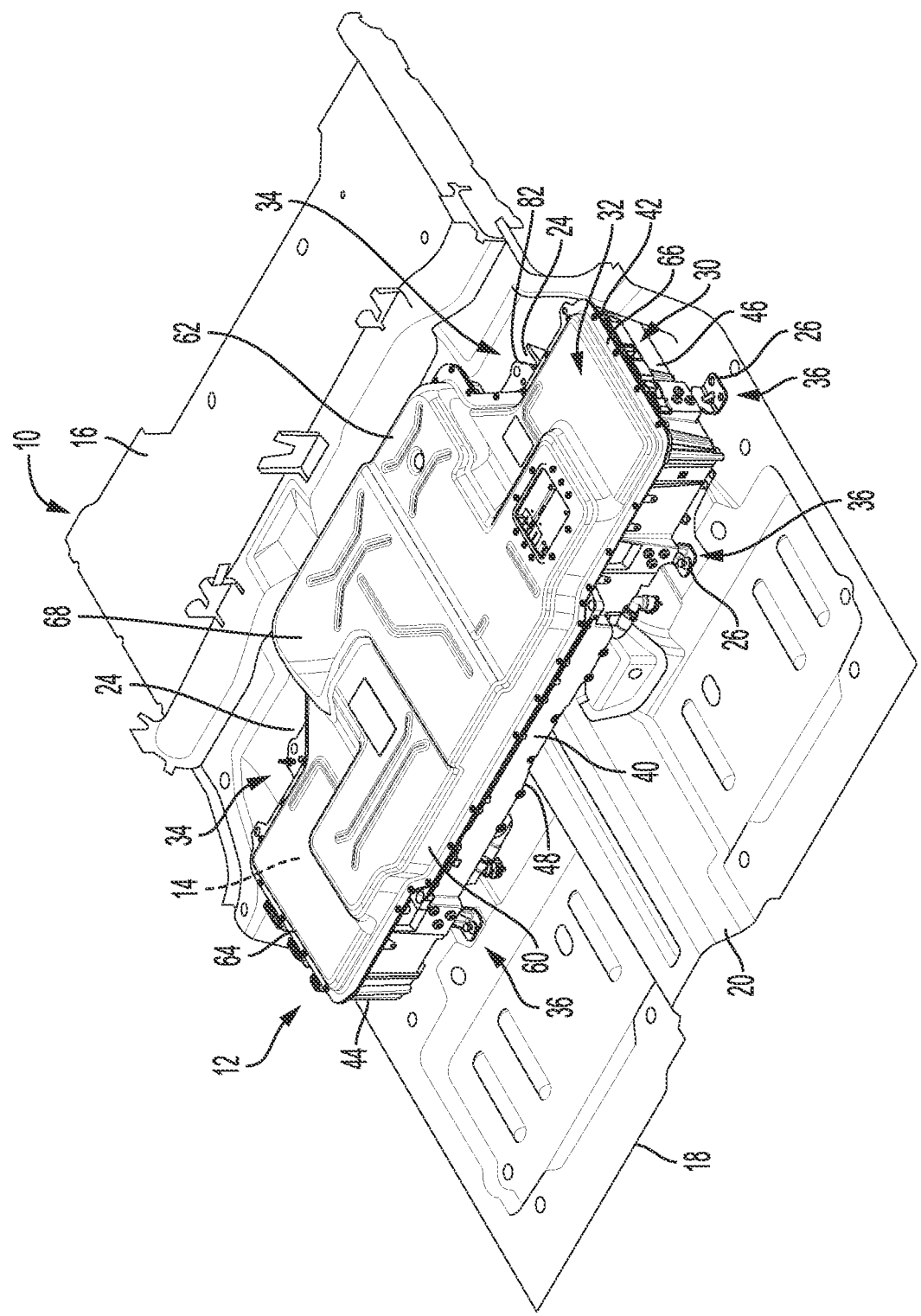
FIG. 1 is a perspective view of an example high voltage battery case assembly coupled a vehicle body, in accordance with the principles of the present application.

With initial reference to FIG. 1, a vehicle underbody 10 is illustrated with a high voltage (HV) battery case assembly 12 in accordance with the principles of the present disclosure. The HV battery case assembly 12 is configured to house and protect one or more high voltage battery modules 14, which are a power source for a motor or generator (not shown) to provide propulsive power to the vehicle. As shown in the example embodiment, the vehicle underbody 10 includes an upper surface 16 and an opposite lower surface 18. The upper surface 16 provides at least a partial support for the HV battery case assembly 12 and includes a central support 20 as well as a forward support 22 and a pair of rearward supports 24 projecting outwardly from the underbody upper surface 16.

In the example implementation, the vehicle underbody 10 includes a plurality of attachment apertures 26 to facilitate coupling the HV battery case assembly 12 to the vehicle underbody 10, as described herein in more detail. As shown, the HV battery case assembly 12 is positioned centrally on the underbody 10 in a pre-defined area to avoid potential intrusions during impact events. As further described herein, the HV battery case assembly 12 includes a plurality of sacrificial attachments designed to break at predefined impact loads to protect the assembly 12 from damage. As a result, the vehicle underbody 10 and HV battery case assembly 12 advantageously do not require more expensive higher strength materials, impact blockers, body reinforcements, structural inserts or the like to isolate the battery case from impact loading.

Figure 4:
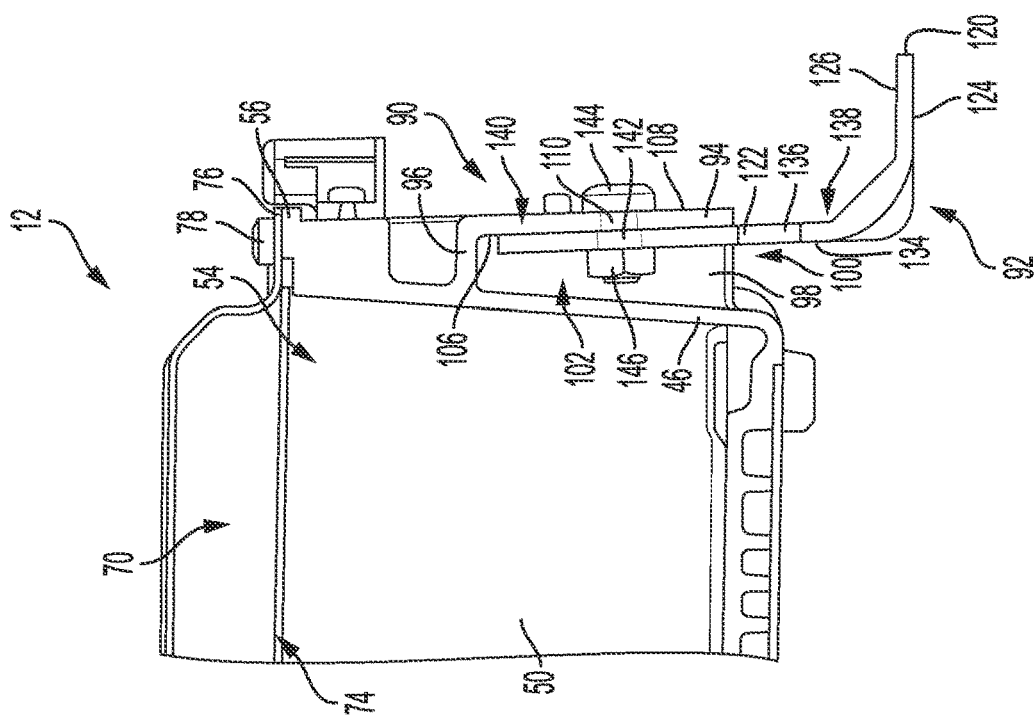
FIG. 4 is a cross-sectional view of the sacrificial attachment shown in FIG. 2 and taken along line 4-4, in accordance with the principles of the present application.

With additional reference to FIGS. 2-4, the HV battery case assembly 12 will be described in more detail. In the example embodiment, the HV battery case assembly 12 generally includes a battery case 30, a cover 32, non-sacrificial attachments 34, and sacrificial attachments 36. The battery case 30 includes a front wall 40, a rear wall 42, side walls 44, 46, and a bottom wall 48 defining a lower cavity 50 (FIG. 4) for holding and supporting the one or more HV battery modules 14. The battery case 30 includes an upper perimeter flange 52 defining an open end 54 (FIG. 4) to receive the HV battery modules 14 and associated equipment. The upper perimeter flange 52 includes a plurality of fastener apertures 56.

In the example embodiment, the cover 32 includes a front wall 60, a rear wall 62, side walls 64, 66, and a top wall 68 defining an upper cavity 70 (FIG. 4) for housing or providing clearance to at least a portion of the HV battery modules 14 and/or associated equipment. The cover 32 also includes a lower perimeter flange 72 defining an open end 74 (FIG. 4). The lower perimeter flange 72 is configured to be received by the battery case upper perimeter flange 52 to thereby enclose the HV battery modules 14 and associated equipment within the lower and upper cavities 50, 70. The lower perimeter flange 72 includes a plurality of fastener apertures 76 configured to align with the upper perimeter flange fastener apertures 56 and receive a plurality of fasteners 78 (e.g., bolts) for removably securing the cover 32 to the battery case 30.

Figure 2:
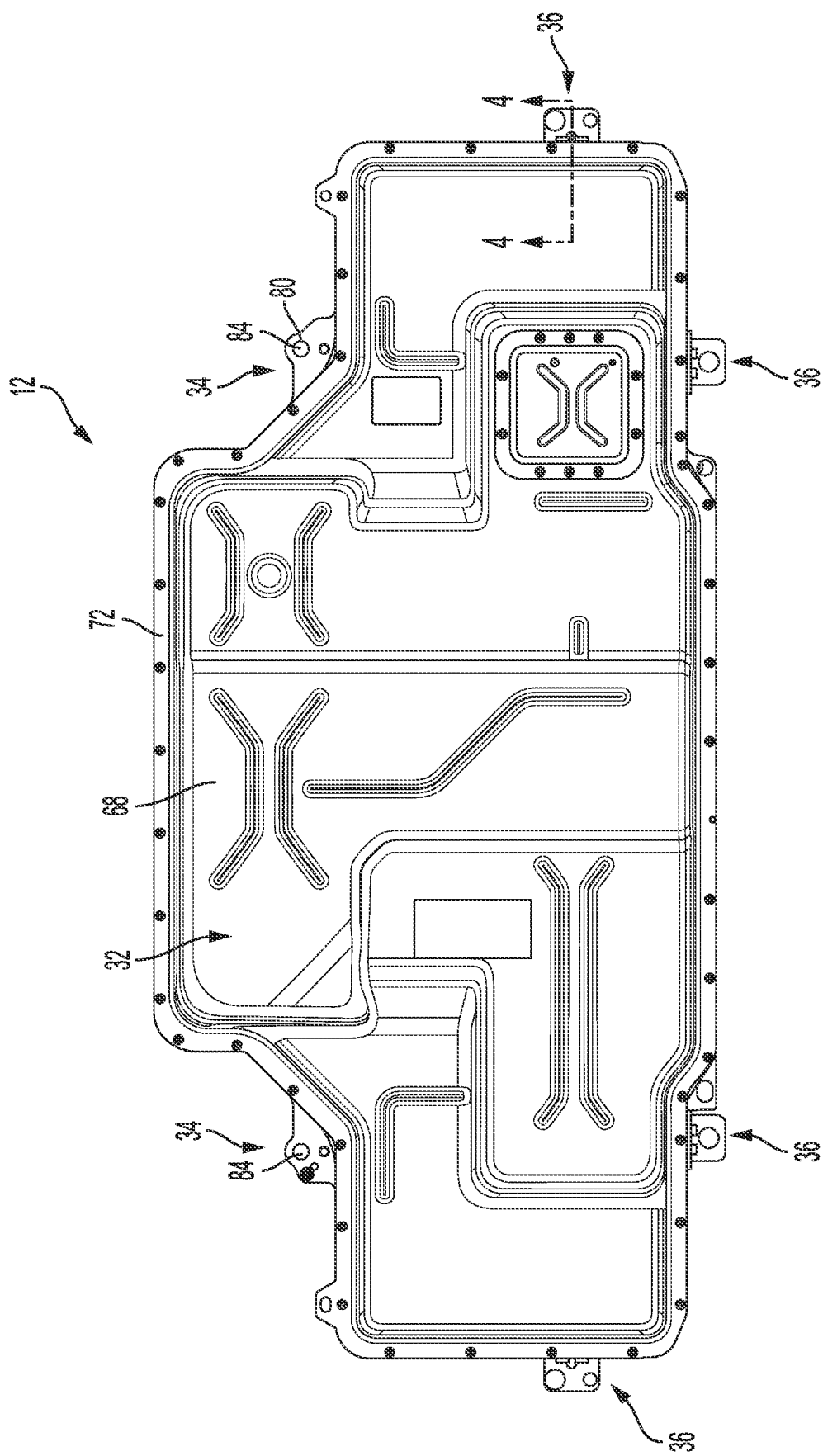
FIG. 2 is a plan view of the high voltage battery case assembly shown in FIG. 1, in accordance with the principles of the present application.
Figure 3:
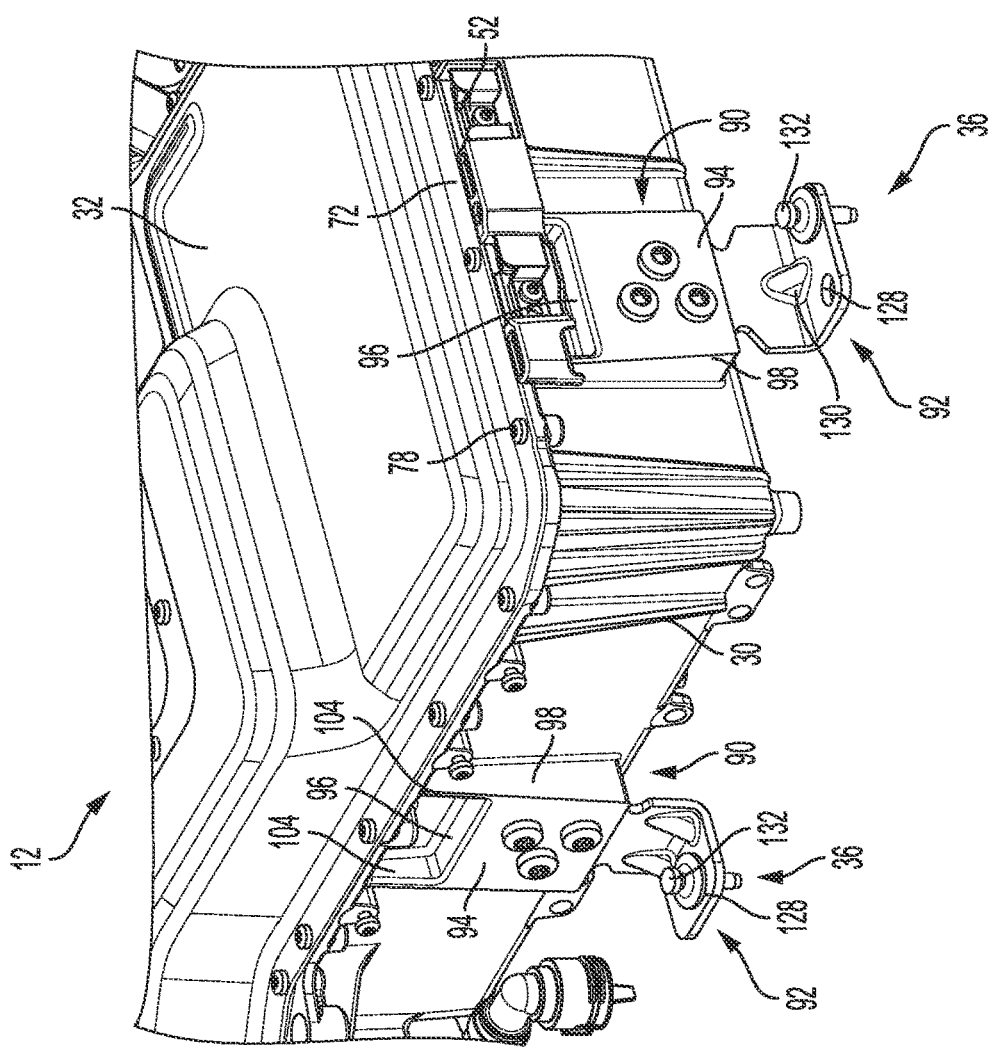
FIG. 3 is an enlarged view of the high voltage battery case assembly of FIG. 1 showing example sacrificial attachments in accordance with the principles of the present application.

With continued reference to FIGS. 1 and 2, as noted herein, the HV battery case assembly 12 also includes non-sacrificial attachments 34 to attach to vehicle underbody 10. In the example implementation, the non-sacrificial attachments 34 are integrally formed with the battery case 30, which may be, for example, fabricated as a die cast aluminum case. The non-sacrificial attachments 34 are flange-like members integrated with and extending outwardly from the battery case rear wall 42. During assembly, each non-sacrificial attachment 34 is configured to be disposed on one of the rearward supports 24 and includes a fastener aperture 80, which is configured to be aligned with a fastener aperture 82 formed in the rearward support 24. The fastener apertures 80, 82 are configured to receive a fastener 84 for securing the non-sacrificial attachment 34 to the vehicle underbody 10.

In the example embodiment, the battery case 30 includes a pair of non-sacrificial attachments 34 located at the rear wall 42. A first non-sacrificial attachment 34 is disposed toward side wall 44 on one side of the vehicle, while a second non-sacrificial attachment 34 is disposed toward side wall 46 on the opposite side of the vehicle. It will be appreciated, however, battery case 30 may have any suitable number of non-sacrificial attachments 34 and locations on the battery case 30 that enables HV battery case assembly 12 to function as described herein.

With continued reference to FIGS. 3 and 4, the sacrificial attachments 36 will be described in more detail. As described herein, the sacrificial attachments 36 are configured to attach to underbody 10 and break at predefined impact loads. This allows portions of the HV battery case assembly 12 to detach from the vehicle underbody 10 during an impact, thereby preventing the impact loads from being transferred to the HV battery case assembly 12 and affecting the integrity thereof. In the example embodiment, each sacrificial attachment 36 includes a sacrificial pocket 90 and an attachment bracket 92.

In the example implementation, the sacrificial pocket 90 is formed in the body of the battery case 30, for example, during casting thereof. As shown in the illustrated implementation, the sacrificial pocket 90 generally includes an outer wall 94, an upper wall 96, and a pair of opposed outer reinforcement walls 98. Along with battery case walls (e.g., 40, 44, 46), the sacrificial pocket 90 defines an opening 100 to an interior pocket or cavity 102. The upper wall 96 is coupled to and extends between the battery case wall and the outer wall 94, as well as between the outer reinforcement walls 98. Each reinforcement wall 98 is coupled between the battery case wall and the outer wall 94 and includes an upper portion 104 coupled to the battery case upper perimeter flange 52 to provide further reinforcement therewith. The outer wall 94 is coupled to and extends between the opposed outer reinforcement walls 98 and includes an inner surface 106, an opposite outer surface 108, and a plurality of fastener apertures 110 formed therethrough.

In the example embodiment, the attachment bracket 92 is a generally L-shaped stamped metal (e.g., steel) bracket and includes a base plate 120 coupled to case plate 122. However, it will be appreciated that attachment bracket 92 may be fabricated from various other materials and have any suitable shape that enables HV battery case assembly 12 to function as described herein. The base plate 120 includes a lower surface 124, an opposite upper surface 126, and one or more locator apertures 128 formed therethrough. Further, a reinforcement rib 130 extends between the base plate 120 and the case plate 122. The locator apertures 128 are configured to facilitate proper orientation of the HV battery case assembly 12 relative to the underbody 10 during installation.

In the example embodiment, the case plate 122 includes an inner surface 134, an opposite outer surface 136, a proximal end 138, a distal end 140, and one or more fastener apertures 142 formed therethrough. The proximal end 138 is coupled to and extends outwardly from the base plate 120 and the fastener apertures 142 are arranged toward the distal end 140. As shown in FIG. 4, the distal end 140 extends into the interior pocket cavity 102 and the case plate outer surface 136 is arranged against the inner surface 106 of the sacrificial pocket outer wall 94. With outer wall apertures 110 and case plate apertures 142 aligned, fasteners 144 (e.g., bolts with nuts 146) are inserted therethrough to thereby couple the attachment bracket 92 to the battery case 30.

During an example operation, the HV battery case assembly 12 is provided with the HV battery modules 14 housed within battery case 30 and the cover 32 secured thereto. The HV battery case assembly 12 is secured to the vehicle underbody 10 via the non-sacrificial attachments 34 and the sacrificial attachments 36. During one example impact event, an impact load is transferred to the vehicle underbody 10. A portion of this impact load is then transferred to the attachment brackets 92, which in turn transfer load to the sacrificial pocket 90. With lower or initial loads, the attachment bracket 92 may deform and absorb some load while transferring to the sacrificial pocket 90.

However, if the load is high enough, the sacrificial pocket 90 is designed with a thin-walled outer wall 94, which is attached to the case plate 122. The remaining upper wall 96 and outer reinforcement walls 98 may be formed thicker than outer wall 94 and are secured to the battery case 30, which also has relatively thicker walls. Thus, if the impact load is high enough, the attachment bracket 92 transfers the force to the cast, thin-walled outer wall 94, which is then broken or sheared away from the upper wall 96 and outer reinforcement walls 98. This breaks the attachment between the vehicle underbody 10 and the HV battery case assembly 12 such that the impact load is not transferred to the case body 30. Accordingly, during the impact event, load is transferred to the sacrificial attachments 36, which sever or break under the load (if high enough) to prevent forces being transferred to the battery case 30. At the same time, the non-sacrificial attachments 34 remain secured to the HV battery case assembly 12 to ensure at least a portion of the assembly remains secured to the vehicle underbody 10.

Described herein are systems and methods for protecting the integrity of HV battery case assemblies from impact loading. The strategy utilizes a combination of non-sacrificial and sacrificial attachments to the vehicle underbody. The non-sacrificial attachments are designed to withstand predetermined impact loads and are directly bolted to the underbody to prevent the battery case from being dislodged. The sacrificial attachments are designed to break at the predetermined impact loads and include sacrificial pockets with thin wall sections. The main battery case has relatively thicker wall sections. The sacrificial pockets are attached to the underbody through stamped steel brackets, which deform under impact loading and absorb some energy. If the impact energy is above a predetermined amount, the thin-walled section of the sacrificial pocket locally breaks, thus maintaining the structural integrity of the main battery case. Accordingly, the described systems combine functionality of design with a lower cost, smaller packaging space solution that can be processed quickly due to fewer parts and fewer fasteners.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A high voltage battery case assembly for a vehicle, the assembly comprising:
   a battery case having a plurality of walls at least partially defining a cavity configured to receive one or more high voltage battery modules;
   a sacrificial pocket formed on an exterior of the battery case and including a severable thin-walled section; and
   an attachment bracket comprising a coupling between the sacrificial pocket and a body of the vehicle,
   wherein the thin-walled section is configured to intentionally break away from the sacrificial pocket when the attachment bracket receives an impact load of a predetermined energy level to thereby sever the coupling between the sacrificial pocket and the vehicle body to facilitate preventing transfer of the impact load to the battery case.

2. The assembly of claim 1, further comprising a non-sacrificial attachment integrally formed with the battery case,
   wherein the non-sacrificial attachment is configured to be coupled to the vehicle body and is designed to withstand the impact load to facilitate preventing dislodging of the high voltage battery case assembly from the vehicle body.

3. The assembly of claim 1, further comprising a cover configured to removably couple to the battery case to enclose the one or more high voltage battery modules within the cavity, wherein the battery case plurality of walls includes a front wall, a rear wall, opposed first and second side walls, and a bottom wall.

4. The assembly of claim 3, wherein the sacrificial pocket comprises:
a first sacrificial pocket integrally formed with the first side wall;
a second sacrificial pocket integrally formed with the second side wall;
a third sacrificial pocket integrally formed with the front wall; and
a fourth sacrificial pocket integrally formed with the front wall.

5. The assembly of claim 4, further comprising:
a first non-sacrificial attachment integrally formed with the battery case; and
a second non-sacrificial attachment integrally formed with the battery case,
wherein the first and second non-sacrificial attachments are configured to be coupled to the vehicle body and are designed to withstand the impact load to facilitate preventing dislodging of the high voltage battery case assembly from the vehicle body.

6. The assembly of claim 1, wherein the attachment bracket is coupled to the thin-walled section.

7. The assembly of claim 1, wherein the sacrificial pocket comprises:
an outer wall;
an upper wall; and
a pair of opposed reinforcing side walls.

8. The assembly of claim 7, wherein the sacrificial pocket defines an opening and an interior pocket cavity.

9. A high voltage battery case assembly for a vehicle, the assembly comprising:
a battery case having a plurality of walls at least partially defining a cavity configured to receive one or more high voltage battery modules;
a sacrificial pocket formed on an exterior of the battery case and including a thin-walled section; and
an attachment bracket configured to couple between the sacrificial pocket and a body of the vehicle,
wherein the thin-walled section is configured to intentionally break away from the sacrificial pocket when the attachment bracket receives an impact load of a predetermined energy level to thereby facilitate protecting the high voltage battery case assembly from the impact load,
wherein the sacrificial pocket includes an outer wall, an upper wall, and a pair of opposed reinforcing side walls,
wherein the sacrificial pocket defines an opening and an interior pocket cavity, and
wherein at least a portion of the attachment bracket is received within the interior pocket cavity.

10. The assembly of claim 8, wherein the outer wall is the thin-walled section and includes an inner surface facing the interior pocket cavity.

11. The assembly of claim 10, wherein the attachment bracket is coupled to the inner surface of the outer wall.

12. The assembly of claim 11, wherein the outer wall defines a first set of fastener apertures and the attachment bracket defines a second set of fastener apertures,
wherein the first and second set of fastener apertures are aligned and receive one or more fasteners therethrough to thereby couple the attachment bracket to the sacrificial pocket.

13. The assembly of claim 7, wherein the battery case includes a perimeter flange, and
wherein each of the reinforcing side walls is coupled to the perimeter flange and one wall of the plurality of walls.

14. The assembly of claim 1, wherein the sacrificial pocket and thin-walled section are integrally cast with the battery case.

15. The assembly of claim 1, wherein the attachment bracket is an L-shaped stamped metal bracket configured to absorb at least a portion of the impact load.

16. A vehicle comprising:
a body; and
a high voltage battery case assembly including:
a battery case having a plurality of walls at least partially defining a cavity configured to receive one or more high voltage battery modules;
a sacrificial pocket formed on an exterior of the battery case and including a severable thin-walled section; and
an attachment bracket comprising a coupling between the sacrificial pocket and the body,
wherein the thin-walled section is configured to intentionally break away from the sacrificial pocket when the attachment bracket receives an impact load of a predetermined energy level to thereby sever the coupling between the sacrificial pocket and the vehicle body to facilitate preventing transfer of the impact load to the high voltage battery case assembly.

17. The vehicle of claim 16, wherein the plurality of walls includes a front wall, a rear wall, opposed first and second side walls, and a bottom wall.

18. The vehicle of claim 17, wherein the sacrificial pocket comprises:
a first sacrificial pocket integrally formed with the first side wall;
a second sacrificial pocket integrally formed with the second side wall;
a third sacrificial pocket integrally formed with the front wall; and
a fourth sacrificial pocket integrally formed with the front wall.

19. The vehicle of claim 18, further comprising:
a first non-sacrificial attachment integrally formed with the battery case rear wall; and
a second non-sacrificial attachment integrally formed with the battery case rear wall,
wherein the first and second non-sacrificial attachments are configured to be coupled to the vehicle body and are designed to withstand the impact load to facilitate preventing dislodging of the high voltage battery case assembly from the vehicle body.

* * * * *